Oct. 1, 1968  C. T. NICHOLSON  3,404,211
HERMETICALLY SEALED ELECTRICAL TRANSFORMER CONNECTIONS
Filed Jan. 10, 1964  5 Sheets-Sheet 1
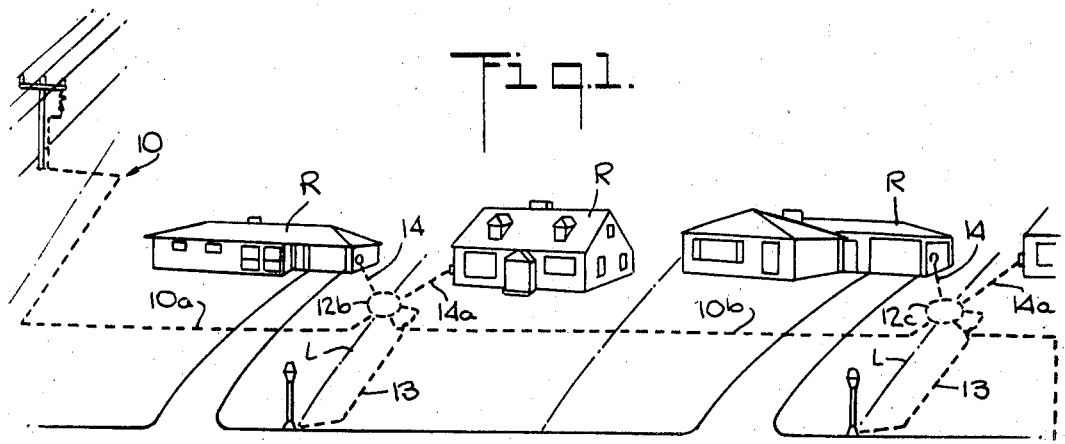
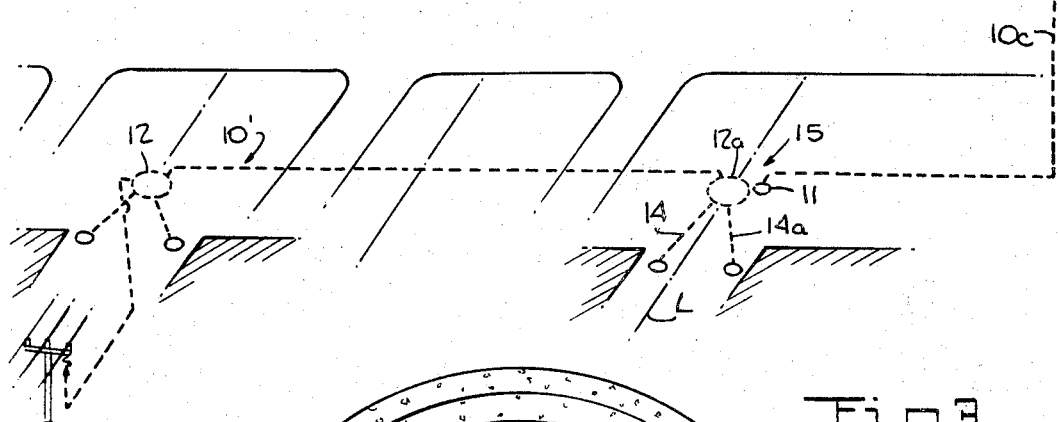
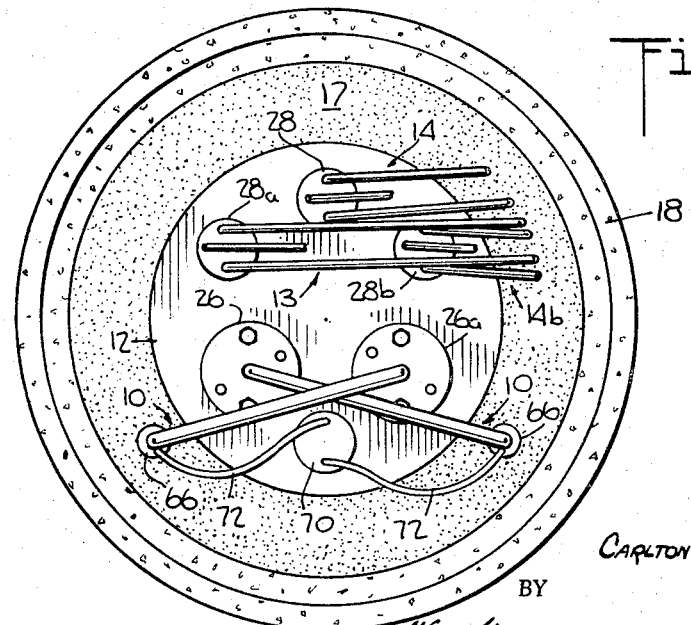
INVENTOR.
CARLTON T. NICHOLSON
BY
Ward Neal, Haselton Orrin + McElhannon
ATTORNEYS

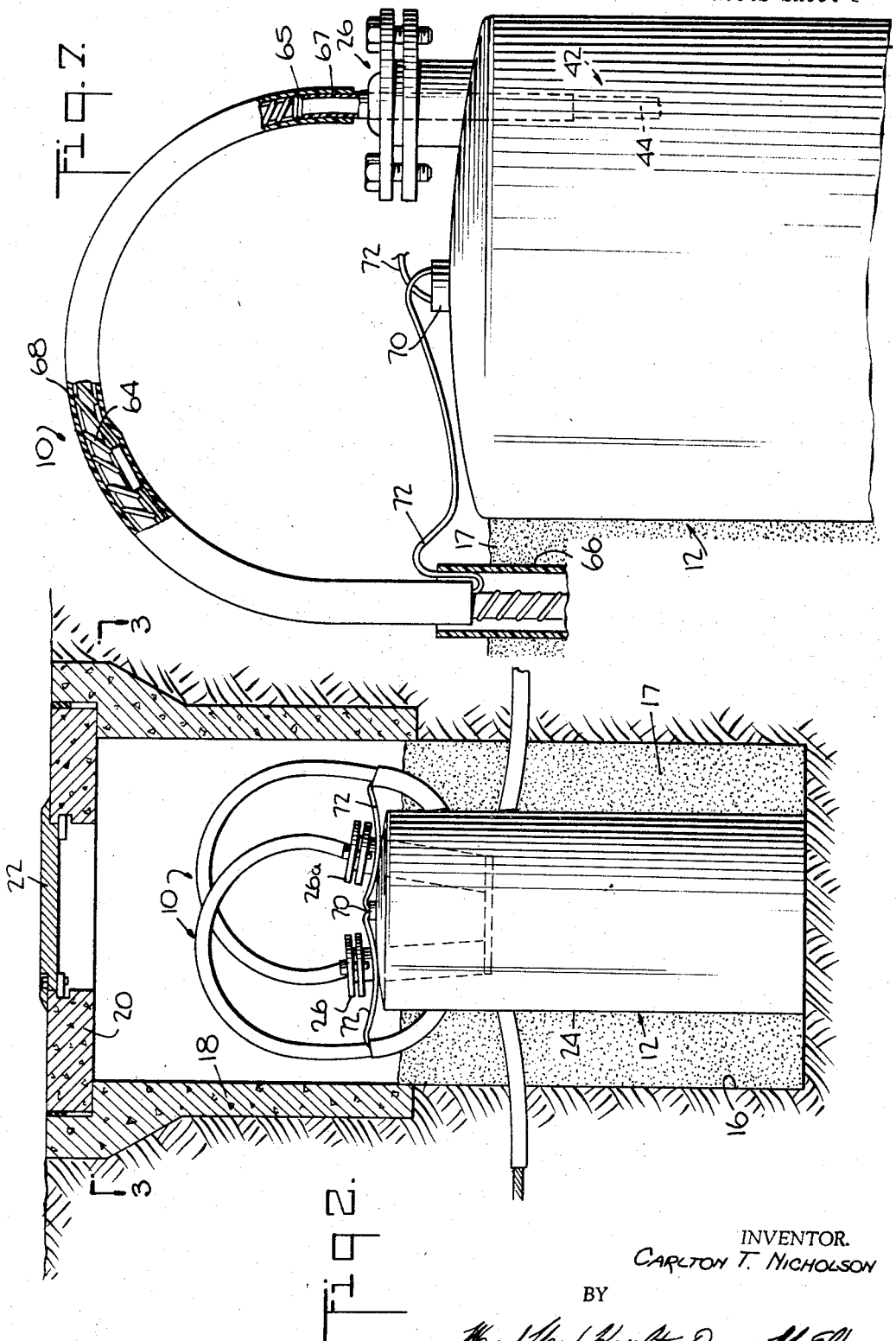

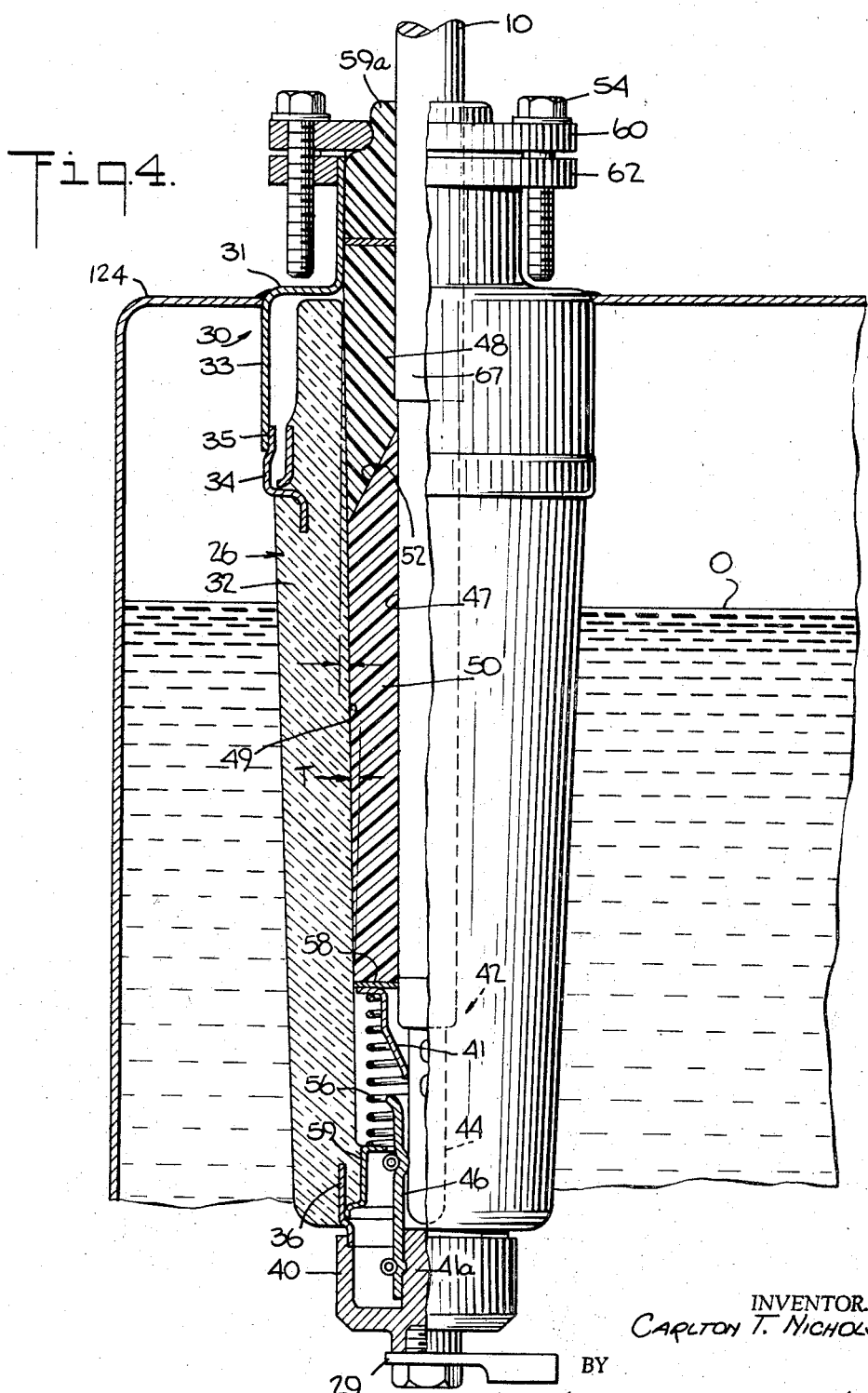

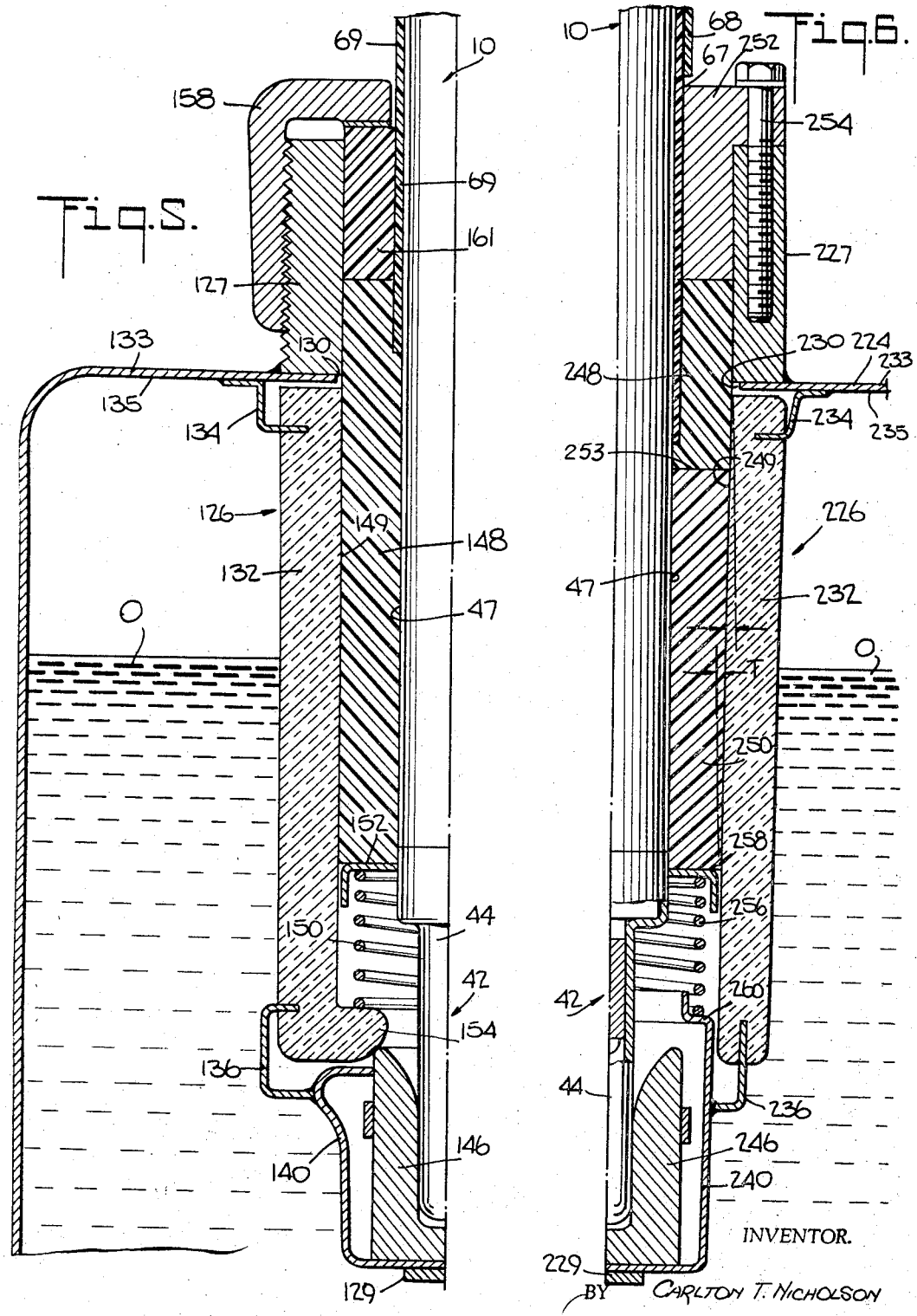

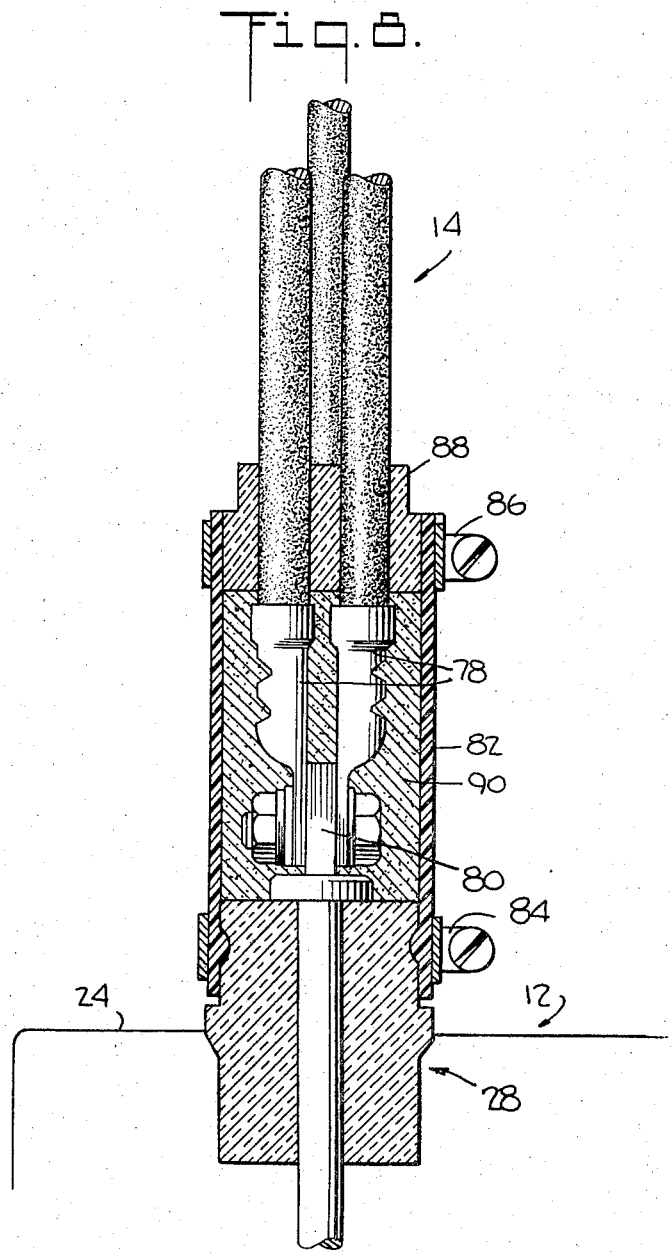

3,404,211
HERMETICALLY SEALED ELECTRICAL TRANSFORMER CONNECTIONS
Carlton T. Nicholson, Orchard Park, N.Y., assignor to Niagara Mohawk Power Corporation, Buffalo, N.Y., a corporation of New York
Filed Jan. 10, 1964, Ser. No. 336,957
6 Claims. (Cl. 174—18)

The present invention relates to electrical distribution systems and, more particularly, to a novel underground system for distribution of electrical energy and to novel equipment for use in such system.

The inherent advantages of an underground distribution system of electrical power, as compared with an overhead system, have long been known. These include more reliable service with less susceptibility to interruption due to weather damage. This is particularly important today with the increased employment of electricity for cooking, heating and other household uses. Also, the underground system eliminates unsightly poles and overhead wires, permitting better and more aesthetic use of the space between adjacent structures. Likewise, easements and rights-of-way are easier to negotiate for underground cables than for an overhead system. However, heretofore, the costs of installation of underground distribution systems have been substantially greater than those for an equivalent overhead system, relegating underground systems to urban commercial areas where overhead systems could not be employed.

In accordance with the present invention, which is particularly suitable for new residential subdivisions and redevelopment areas, there is provided a novel system of residential electrical distribution, which includes a buried primary cable and an "open-looped" series of buried transformers, each serving preferably two residences.

Another feature of the system is that the "open-loop" arrangement ensures that, in the event of a power failure in the buried primary cable, the interruption is kept to a minimum by simply shutting off the power, isolating the faulty cable section, closing the opening in the loop and restoring power. The transformers are preferably located in the front of the houses and on alternate side lot lines so that one transformer is adapted to serve two adjacent residences. This arrangement substantially reduces the length of the secondary connections to the residences, which represent a substantial segment of underground installation costs.

The transformers employed with the present invention are preferably of the oil-filled type, and have a stainless steel or other highly resistant material as an outer shell. The transformers are located in below-grade chambers and are buried with only the tops thereof exposed. Contrary to what was heretofore believed by the art, these transformers, of capacities even as high as 25 kva. perform better thermally in such buried surroundings than in conventional overhead locations. It was believed that such buried transformers would overheat, but this was found not to be the case. One explanation for this phenomenon may reside in the fact that transformers with the relatively small capacities employed in the present invention have a comparatively large surface area relative to their capacity. This relationship is dictated by physical considerations. Consequently, the external thermal surroundings are not as critical as heretofore believed.

In addition, the transformers are provided with two primary taps utilizing novel bayonet-type internal primary cable connectors or "potheads." The primary taps are yoked internally in the transformer with one tap serving as a primary inlet and the other as a primary outlet. The "potheads" comprise an inverted outer hermetic glass bushing having an internal elastomeric filling system and a resiliently-biased friction engagement for the primary cable end. When the cable is inserted into the pothead and releasably secured therein, the pothead is hermetically sealed against the entrance of moisture or other foreign matter into the transformer.

The bayonet pothead and double primary taps for the transformer completely eliminate all field splicing of cable and permit ready connection and disconnection of the transformers and primary cable, greatly simplifying installation and maintenance, and substantially reducing field labor and costs. By use of the novel distribution arrangement and "pothead" construction, the underground system of the present invention maintains installation costs at a minimum, making an underground distribution system, for the first time, truly competitive cost-wise with the conventional overhead systems.

Further objects and advantages of the invention will be obvious herefrom or may be learned by practice with the invention, the same being realized and attained by means of the instrumentalities and combinations pointed out in the appended claims.

The foregoing general description and the following detailed description are exemplary and explanatory, but are not restrictive of the invention.

Of the drawings illustrating by way of example preferred embodiments of the invention:

FIG. 1 is a schematic perspective view of the underground distribution system of the present invention;

FIG. 2 is a cross-sectional detail view of a transformer installation in the distribution system of the present invention;

FIG. 3 is a plan view of the installation of FIG. 2 taken along line 3—3, FIG. 2;

FIG. 4 is an enlarged, detailed sectional view illustrating the connections of the primary cable and transformer;

FIG. 5 is an enlarged, detailed sectional view illustrating a modified form of connection of the primary cable and transformer;

FIG. 6 is an enlarged, detailed sectional view illustrating a third form of connection of the primary cable and transformer;

FIG. 7 is a detailed sectional view of the novel pothead construction for completing the connection of the primary cable and transformer;

FIG. 8 is a detailed sectional view illustrating the connections of the secondary cables and transformer.

GENERAL DESCRIPTION

The present invention relates to an underground distribution system of the generally "open-loop" type, comprising main or primary distribution cable 10, 10′ disposed as shown in FIG. 1, preferably across the front, clear area of the residences R serviced by the system. By locating cable 10 along the front of the residences R, a number of advantages are realized. These include convenience to access roads and, generally, freedom from extensive paintings and supplemental construction, all of which facilitate maintenance of the system.

The system includes a plurality of buried transformers 12, each located on the dividing property line L between two residences R, thereby permitting service of the two residences from a single transformer. Service cables 14, 14a are run from each transformer 12 underground to the residences R serviced thereby. If desired, an underground street-lighting cable 13 can also be provided from the transformer 12.

The front yard location of the primary cables 10, 10' and the positioning of the transformers 12 between adjacent residences R also permits substantial reduction in secondary cables 13, 14 and 14a, which is an important factor in installation cost reduction.

Primary cable 10, preferably formed of sections 10a, 10b and 10c for illustrative purposes, is preferably laid out in a series circuit of the "open-loop" configuration. The primary loop is open at some terminal point, as at 15, with preferably approximately one-half the transformers 12 supplied on each side of the opening in the loop. As described in greater detail hereinafter, each transformer 12 is provided with readily-releasable cable connections thereto and end 11 of cable 10 is inserted into such shielded connection in the ground adjacent the transformer 12a at point 15. If trouble develops in primary cable 10, as, for example, in section 10b, cables 10 and 10' are deenergized and end 11 of cable 10 is disconnected from its associated connection in the sand and connected to transformer 12a adjacent opening 15. Section 10b of cable 10, wherein the trouble has developed, is then isolated by removing the ends of the faulted cable section from their associated transformers 12b and 12c, and the cables 10, 10' are re-energized. Transformer 12c, previously energized from cable sections 10a and 10b, is now energized by cable 10' and section 10c through transformer 12c, while transformer 12b continues to be energized by section 10a and transformer 12c likewise continues to be energized by cable 10'. The faulted section 10b is thereby promptly isolated and can then be repaired at leisure with a minimum of service interruption.

The underground distribution system of the present invention eliminates all the maintenance problems of the conventional overhead system including storm, lightning and traffic damage. It is virtually maintenance-free, is readily accessible and long-lasting. This system is particularly well suited to new residential subdivisions and re-development areas.

Transformers

Each transformer 12 used in the underground distribution system of the present invention is located beneath the ground level in an accommodating augered hole 16 (see FIG. 2). The upper portion of hole 16 has a circular concrete or tile wall 18, preferably pre-cast with the opening thereof covered by a lid 20. The hole 16 is backfilled with filterbed sand or thermal sand 17 approximately to the top of the transformer. If desired, lid 20 may have an access plate 22 therein for maintenance and repair.

The transformer 12 itself is preferably of the overhead or conventional pole-top type, but is oil-filled with a hermetically-welded, stainless steel or copper-clad outer casing 24 to resist the intimate soil contact encountered in the present buried distribution system. The primary and secondary entrances 26, 26a and 28, 28a, 28b, respectively, are hermetically-sealed glass bushings (see FIG. 3). The primary bushings 26, 26a are adapted to removably receive the primary cables 10, 10' or sections 10a, 10b and 10c thereof, as described in greater detail hereafter, to permit ready connection and disconnection of the transformer.

Each transformer 12 is best suited for grounded supply with the primary bushings 26 and 26a serving as a primary inlet and outlet, respectively. Thus, the circuit is adapted to enter and leave the transformer 12 in one continuous loop with the circuit yoked between bushings 26 and 26a under oil and the transformer primary winding (not shown) being connected to the yoke 29. By providing dual primary taps for the transformer 12, it is possible for the primary cable to be connected directly to the transformers, thereby eliminating all taps or wire splices off the main primary cables, which, together with the bayonet bushing construction next described in detail, results in substantially easier, more rapid and less expensive field installation and hook-up of transformers 12.

It has been found that a 10 kva. transformer would suffice for most residential uses in the buried distribution system of the present invention, and a suitable oil-filled transformer with an hermetically-sealed, stainless steel casing is available from the Kuhlman Electric Company, Birmingham, Mich. It will be understood, however, that the cable connections to such transformer are to be modified, as described in detail hereinafter.

Transformer primary bushings

The primary bushings or "potheads" 26, 26a are of novel bayonet construction with the preferred constructions thereof illustrated in FIG. 4. To accommodate the bushings in the transformer, a cable entry section 30 is formed in the top of the transformer tank, preferably of the same metal as housing 24. Section 30 includes a portion 31 sealed to housing 24 as by welding, brazing or soldering, and extending above the tank top, while a portion 33 thereof is internally disposed in transformer 12. The bushings 26 comprises an outer sleeve 32 of insulating material such as glass, porcelain, or the like, having imbedded therein a pair of upper and lower metallic flanges 34 and 36. Sleeve 32 extends below the transformer oil level "O" and is preferably formed of an electrical grade borosilicate glass having a thermal coefficient of expansion of the metal flanges 34 and 36, which are preferably of a 42% Ni-Fe alloy. The sleeve 32 and metal flanges 34 and 36 thus expand and contract together ensuring a tight, permanent, hermetic seal with section 30. The sleeve and flanges are commercially available as a unit from the General Electric Company, Bushing Products Section, Pittsfield, Mass.

In assembled position, shown in FIG. 4, upper flange 34 is brazed as at 35 to the lowermost zone of portion 33, while the lower flange 36 is brazed to a brass cap 40 carrying the primary cable connector. Cap 40, in turn, is connected to the primary cable yoke 29. Cable 10 is concentrically disposed axially within sleeve 32 with its terminal end 42 provided with a bayonet shroud 44 crimped in electrical connection thereon and adapted to be yieldably retained by spring-biased bayonet fingers 46 in electrical contact with stem 41a of cap 40.

Between the outer periphery 47 of cable 10 and the inner wall 49 of sleeve 32 and completing the hermetically-sealed bushing, there is disposed a pair of vertically contiguous, elastomeric members 48 and 50. Lowermost member 50 is preferably of insulating material with low power factor and high dielectric strength. Polyurethane has been found suitable for this purpose. Upper member 48 is of semi-conducting material. These two filler members are formed precisely to the geometry of sleeve 32 which permits them to conform with air-free interfaces to each other, to the sleeve 32 and to the cable 10. Dielectric stress control is achieved by the conical junction or interface 52 of the semi-conducting and insulating elastomer members 48 and 50. Complete air exclusion is achieved by providing a precisely-designed and controlled taper T on the outside surface of the elastomers so the central portion where the dielectric gradient is located is greater in diameter than the inside of the porcelain housing. Thus. as the elastomers and cable are drawn into the housing by the bolts 54 of bushing 26, radial pressure is exerted first in the central region and progressively extends along the cable and the housing surfaces forcing out the air. The lower end of bushing 26 contains bayonet guides 41 and a captive compression spring 56 between spaced metal end seat or washer 58 and metal flange 59. Spring 56 is operative to apply end thrust to the elastomer system as bolts 54 are tightened down, providing a permanent, air-free, moisture-proof seal.

To complete the bushing, a top cap 59a of elastomeric material is provided to firmly seat cable 10 in bushing 26 between top flanges 60 and 62, through which bolts 54 are threaded, likewise preventing entry of undesirable foreign matter or moisture into the bushing. Suitable elastomeric materials for members 48 and 50 are commercially available from the Joslyn Manufacturing and Supply Company, Chicago, Ill.

The connection of cable 10 to transformer 12 is thus a simple operation. End 42 of cable 10 is suitably prepared and provided with shroud 44 as described in detail hereinbelow. Cable 10 is then inserted into its associated bushing 26, 26a, which has been prefabricated before installation of transformer 12. When cable 10 has been firmly seated therein and shroud 44 properly gripped by resiliently-biased fingers 46, top bolts 54 are tightened down to complete the hermetically-sealed connection of the primary cable and transformer.

FIG. 5 discloses an alternative form of bayonet-type pothead construction. Since the construction thereof is symmetrical, only one-half thereof is shown in the interests of brevity. In this embodiment, to accommodate the primary cables, the transformer housing 124 is provided with a plurality of cable entry openings 130, each defined by an entry wall 127 attached to and extending above the transformer casing top 133.

In this arrangement, the bushings 126 comprise an outer glass sleeve 132 having imbedded therein a pair of upper and lower flanges 134 and 136. Sleeve 132 extends below the transformer oil level O and is formed of an electrical grade borosilicate glass having a thermal coefficient of expansion of the metal flanges 134 and 136, which are preferably of a 42% Ni-Fe alloy. The sleeve 132 and metal flanges 134 and 136 thus expand and contract together ensuring a tight, permanent, hermetic seal to housing 124. The sleeve and flanges are commercially available as a unit from the General Electric Company, Bushing Products Section, Pittsfield, Mass.

In assembled position, shown in FIG. 5, upper flange 134 is brazed to the underface 135 of top 133, while the lower flange 136 is brazed to a metallic cap 140 carrying the primary cable connector. Cap 140, in turn, is connected to the primary cable yoke 129. Primary cable 10 is concentrically disposed axially within sleeve 132 with its terminal end 42 provided as heretofore with a bayonet shroud 44, which is adapted to be yieldably retained in electrical connection by spring-biased bayonet fingers 146 on cap 140.

Between the outer periphery 47 of cable 10 and the inner wall 149 of sleeve 132 and completing the hermetically-sealed bushing, there is disposed an elastomeric sleeve 148, preferably of insulating material with low power factor and high dielectric strength. Polyurethane has been found suitable for this purpose.

Filler sleeve 148 is formed precisely to the geometry of sleeve 132, which permits it to conform to the sleeve 132 and to periphery 47 of the cable 10. If desired, sleeve 132 could taper as heretofore described for sleeves 48 and 50.

The lower end of bushing 126 contains a captive compression spring 150 between metal end seat or retainer 152 and a lip extension 154 formed on glass sleeve 132. Spring 150 is thus operative to apply end thrust to the elastomer system as compression gland 158 is tightened down on the threaded portion of entry wall 127, providing a permanent, air-free, moisture-proof seal.

To complete the bushing, a top compression cap 161 of elastomeric material is provided between the gland 158 and elastomeric sleeve 148 to firmly seat cable 10 within its associated entry wall 127, preventing entry of undesirable foreign matter or moisture into the bushing.

FIG. 6 discloses another modified form of a novel bayonet-type pothead construction, only one-half of which is shown, it being understood that the half cut away is identical to the half illustrated. In this embodiment, transformer housing 224 is provided with a plurality of cable entry openings 230, each being defined by an entry wall 227 attached to and extending above the transformer casing top 233.

Bushings 226 comprise an outer glass sleeve 232 similar in construction and operation to sleeves 32 and 132 hereinbefore described, and having imbedded therein a pair of upper and lower flanges 234 and 236. Sleeve 232 extends below the transformer oil level O and is formed of an electrical grade borosilicate glass having a thermal coefficient of expansion of the metal flanges 234 and 236, which are preferably of a 42% Ni-Fe alloy. The sleeve 232 and metal flanges 234 and 236 thus expand and contract together ensuring a tight, permanent, hermetic seal with transformer housing 224. The sleeve and flanges are commercially available as a unit from the General Electric Company, Bushing Products Section, Pittsfield, Mass.

In assembled position, shown in FIG. 6, upper flange 234 is brazed to the underface 235 of top 233, while the lower flange 236 is brazed to a cap 240 carrying the primary cable connector. Cap 240, in turn, is connected to the primary cable yoke 229. Cable 10 is concentrically disposed axially within sleeve 232 with its terminal end 42 provided with bayonet shroud 44, adapted to be yieldably retained by spring-biased bayonet fingers 246 on cap 240.

Between the outer periphery 47 of cable 10 and the inner wall 249 of sleeve 232 and completing the hermetically-sealed bushing, there is disposed a pair of vertically contiguous concentric elastomeric sleeves 248, 250. Lowermost sleeve 250 is preferably of insulating material with low power factor and high dielectric strength. Polyurethane has been found suitable for this purpose. Upper member 248 is of semi-conducting material. Members 248 and 250 are formed precisely to the geometry of sleeve 232 which permits them to conform to an air-free interface 253, to each other and to the sleeve 232, and to the outside periphery 47 of cable 10. Complete air exclusion may be achieved, if desired, by providing a precisely-designed and controlled taper T on the outside surface of the member 250 so the central portion where the dielectric gradient is located is greater in diameter than the inside of the porcelain housing. Thus, as the elastomers and cable are drawn into the housing by the bolts 254 of bushing 226, radial pressure is exerted first in the central region and progressively extends along the cable and the housing surfaces forcing out the air. However, taper T can be eliminated, if desired, without substantially affecting the operation of bushing 226.

The lower end of bushing 226 contains a captive compression spring 256 between spaced metal end seat or washer 258 and extension 260 formed on cap 240. Spring 256 thus applies end thrust to the elastomer system as bolts 254 are tightened down, providing a permanent, air-free moisture-proof seal.

To complete the bushing, a top compression cap 252 is provided to firmly seat cable 10 in bushing 226 within end wall 227 and prevent entry of undesirable foreign matter of moisture into the bushing. Suitable elastomeric materials for members 248 and 250 are commercially available from the Joslyn Manufacturing and Supply Company, Chicago, Ill.

It will be evident that the novel pothead constructions make cable connections simple and quick, yet with the desired hermetic seal which heretofore required substantial field labor to achieve.

Primary cable construction

Cable 10 is preferably of the concentric-neutral type cable having a plurality of outer concentric neutral conductors 64 (see FIG. 7). Type CD cable, manufactured by Anaconda Wire & Cable Co., New York, N.Y., is suitable for this purpose. Preferably, cable 10 is encased in a plastic tube 66 adjacent its entry into hole 16 and sand bed 17. Tube 66 terminates just above the level of backfill 17 in the transformer hole 16. The terminal end 42 of cable 10, which is to be inserted into bushing 26, 26a of transformer 12, is prepared by folding back the outer neutral conductors 64 to a point 65 along cable 10 outside its associated bushing 26, 26a. Shroud 44 is then applied to the exposed end of cable 10. Next, cable 10 is provided with an outer semi-conducting sleeve 67, preferably heat-shrinkable polyolefin tubing, along the exposed portion of cable 10. Sleeve 67 preferably extends from neutral fold-back point 65 on cable 10, and is dimensioned to terminate just short of the conical interface 52 when the preferred bushing construction of FIG. 4 is employed.

Next, the end of the cable 10 in the transformer hole 16 is enshrouded with a heat-shrinkable, semi-conductive, reinforced plastic tubing 68, such as, Fiberglas reinforced polyolefin. This improves the cable stress control and makes the cable assembly within the hole 16 mechanically sound, while at the same time protecting the exposed cable. Preferably, tubing 68 extends from tube 66 to a point adjacent the entry of cable 10 into its associated bushing 26, 26a. Likewise, it has been found preferable to have tubing 68 encase the end of the semi-conducting sleeve 67 adjacent the neutral fold-back point 65. Semi-conductivity in tubing 68 further improves its value in concentric cable terminations, but, if desired, non-conductive tubing may be used without adverse effect.

To provide a neutral or ground connection for the primary winding of the transformer, the neutral conductors 64 are provided with a neutral extension 72 prior to encasing thereof by tubing 68. After tubing 68 has been applied to cable 10, extension 72 is connected to a neutral transformer bushing 70 to which one end of the primary winding of the transformer 12 is connected internally of the housing.

It will be understood that transformer 12 need not have a separate glass neutral bushing 70, such as bushing 26, 26a, or 28, 28a and 28b, as a suitable boss on the tranformer casing 24 could be used without adverse effect.

The foregoing relates to preparation of cable 10 when the preferred bushings 26, 26a are employed. The preparation of cable 10 can, if desired, vary somewhat as shown with bushing 126 of FIG. 5.

As with bushing 26, the neutral conductors 64 are folded back to a point 65 outside the associated bushing and bayonet shroud 44 applied to the thus-exposed terminal end 42 of cable 10. However, tubing 68 and semi-conducting sleeve 67 are replaced by a single cable encasement 69 of semi-conducting, preferably heat-shrinkable material which extends from the end of tubing 66 to the non-conductive elastomeric material of the bushing, such as sleeve 148 of the illustrated example. However, semi-conductor tape can also be uhed for encasement 69.

In either form of cable preparation, it will be noted that the portion of the cable 10 actually disposed within the transformer bushing is provided with a semi-conducting outer covering to a point at least adjacent the non-conductive elastomeric filler member of its associated bushing.

However, no matter which form of primary cable preparation is employed, the operation is accomplished simply, relatively quickly and inexpensively.

Service cable construction

In order to maintain the field labor in connection with the system of the present invention at a minimum, the secondary or service cables 13, 14, 14a, which are preferably three-wire, run directly from the low voltage transformer bushings 28, 28a, and 28b to their associated residences R and street light.

As shown best in FIG. 8, which illustrates one secondary connection 28 by way of example, bushing 28 is preferably a glass bushing hermetically sealed to the transformer housing 24. The ends of the secondary cable 14 are provided with pressed-on lugs 78 for convenient connection of cable 14 to the bushing terminal 80.

To form a submersible connection, the connection between cable 14 and bushing 28 is enclosed by a rubber or suitable plastic tubing 82. Clamp 84, preferably stainless steel, secures one end of the tubing 82 to bushing 28 while a second clamp 86 at the other end of tubing 82 secures tubing 82, a plug 88 and cable 14 together. The internal area of tubing 82 between bushing 28 and plug 88 is filled with a plastic gum 90 to form moisture-impervious connection between cable 14 and bushing 28, which could be readily made up and dismantled if needed.

While the foregoing description refers to cable 14 and bushing 28, it will be understood that cables 13 and 14a are preferably connected to their associated bushings 28b and 28a in like manner.

Thus, there is disclosed a novel underground electrical distribution system utilizing novel elements, such as, readily-releasable cable transformer connections. By means of the present invention, there is now feasible the installation of an underground system of electrical distribution in areas and under conditions which, heretofore, precluded the economic employment of an underground system.

Although certain particular embodiments of the invention are herein disclosed for purposes of explanation, further modifications thereof, after study of the specification, will be apparent to those skilled in the art to which the invention pertains. Reference should accordingly be had to the appended claims in determining the scope of the invention.

What is claimed and desired to be secured by Letters Patent is:

1. A transformer for buried installation in underground electrical distribution systems, comprising a hermetically sealed corrosion resistant, transformer housing having a selected quantity of oil therein, and at least one cable entrance connector on said housing, said connector comprising a hermetic insulating bushing hermetically sealed to said housing and having an aperture for receiving an end of a cable, a readily-releasable frictional engaging means within and at one end of said aperture for engaging the end of said cable, resilient insulating means in said aperture in engagement with said bushing and engageable with said cable, means on said housing engageable with said resilient insulating means for compressing said resilient insulating means, a moisture-impervious secondary cable connecting means including a further bushing mounted on and sealed to said housing, a water-proof sleeve secured at one end thereof to said further bushing and adapted to extend around an end of a secondary cable, means for securing the other end of said sleeve to said secondary cable, and a removable plastic, insulating material filling said sleeve.

2. In combination, a readily-releasable, hermetically-sealed cable connector, and a transformer having a housing with an opening therethrough, said connector comprising an outer glass sleeve disposed at said opening with one end thereof disposed within and spaced from said housing, means on and sealed to said sleeve for securing and sealing said sleeve to said housing and thereby sealing said opening, a pair of elastomeric sleeve members mounted in end contact with each other and in the bore of said sleeve with their outer peripheries in engagement with the wall of said bore, each of said sleeve members having centrally disposed and axially extending openings therethrough with peripheral walls substantially equal to the periphery of a cable to be connected thereto and the one of said members nearer said end of said sleeve being formed of insulating material and the other thereof being formed of semi-conductive material, rigid metal cap means sealed to said end of said sleeve closing said bore thereof, spring means intermediate said cap means and the end of said one member nearer said cap means for urging said one member away from said end of said sleeve, flexible gripping means mounted in said bore entirely between said cap means and said last-mentioned end of said one member and connected to said cap means for releasably engaging the end of said cable and means exteriorly of said housing and supported thereby for engaging said other member and forcing said members toward said one end of said sleeve, whereby said members are compressed and thereby grip said cable and said wall of said bore.

3. In combination, a readily-releasable, hermetically-sealed cable connector, and a transformer having a housing with an opening therethrough, said connector comprising an outer glass sleeve disposed at said opening with one end thereof disposed within and spaced from said housing, a peripheral flange imbedded in said sleeve and secured and sealed to said housing for thereby sealing said opening, said flange and said sleeve having substantially the same coefficient of thermal expansion, a pair of elastomeric sleeve members mounted in end contact with each other and in the bore of said sleeve with their outer peripheries in engagement with the wall of said bore, each of said sleeve members having centrally disposed and axially extending openings therethrough with peripheral walls substantially equal to the periphery of a cable to be connected thereto and the one of said members nearer said end of said sleeve being formed of insulating material and the other thereof being formed of semi-conductive material, said members having complementary contiguous conical end faces, rigid metal cap means on said end of said sleeve closing said bore thereof, spring means intermediate said cap means and the end of said one member nearer said cap means for urging said one member away from said end of said sleeve, flexible gripping means mounted in said bore entirely between said cap means and said last-mentioned end of said one member and connected to said cap means for releasably engaging the end of said cable, means exteriorly of said housing and supported thereby for engaging said other member and forcing said members toward said one end of said sleeve, whereby said members are compressed and thereby grip said cable and said wall of said bore and means extending from said sleeve interiorly of said housing and electrically connected to said gripping means for electrically connecting said gripping means to said transformer.

4. A readily-releasable, hermetically-sealed cable connection between a transformer having a housing with an opening therethrough and a cable having inner and outer conductors separated by insulation, said cable having a terminal end with an exposed portion of said central conductor, said outer conductor terminating short of said exposed portion and being spaced lengthwise of said cable from said exposed portion by an exposed portion of said insulation and said connection comprising an outer insulating sleeve disposed at said opening with one end thereof disposed within and spaced from said housing, means secured and sealed to said sleeve and secured and sealed to said housing for thereby sealing said opening, a pair of elastomeric sleeve members mounted in end contact with each other and in the bore of said sleeve with their outer peripheries in engagement with the wall of said bore, each of said sleeve members having centrally disposed and axially extending openings therethrough and the one of said members nearer said end of said sleeve being formed of insulating material and the other thereof being formed of semi-conductive material, means on said end of said sleeve closing said bore thereof, spring means intermediate said closing means and the end of said one member nearer said closing means for urging said one member away from said end of said sleeve, said end of said cable having a conductive shroud over said exposed portion of said inner conductor and said end of said cable being disposed with said conductive shroud within the opening of said one member and with at least a portion of said shroud extending beyond said last-mentioned end of said one member, flexible gripping means mounted in said bore between said closing means and said last-mentioned end of said one member and releasably engaging said shroud, means electrically interconnecting said outer conductor of said cable and said other member, and means exteriorly of said housing and supported thereby and engaging said other member and forcing said members toward said one end of said sleeve, thereby compressing said members and causing them to grip said cable and said wall of said bore forming an hermetic seal therewith.

5. A readily-releasable, hermetically-sealed cable connection between a transformer having a housing with an opening therethrough and a cable having inner and outer conductor separated by insulation, said cable having a terminal end with an exposed portion of said central conductor, said outer conductor terminating short of said exposed portion and being spaced lengthwise of said cable from said exposed portion by an exposed portion of said insulation and said connection comprising an outer glass sleeve disposed at said opening with one end thereof disposed within and spaced from said housing, a peripheral flange imbedded in said sleeve and secured and sealed to said housing for thereby sealing said opening, a pair of elastomeric sleeve members mounted in end contact with each other and in the bore of said sleeve with their outer peripheries in engagement with the wall of said bore, each of said sleeve members having centrally disposed and axially extending openings therethrough and the one of said members nearer said end of said sleeve being formed of insulating material and the other thereof being formed of semi-conductive material, means on said end of said sleeve closing said bore thereof, spring means intermediate said closing means and the end of said one member nearer said closing means for urging said one member away from said end of said sleeve, said end of said cable having a semi-conductive sleeve over a portion of the length of said exposed portion of said insulation and in contact with said outer conductor and a conductive shroud over said exposed portion of said inner conductor and said end of said cable being disposed with said conductive shroud within the opening of said one member and with a portion of said shroud extending beyond said last-mentioned end of said one member, flexible gripping means mounted in said bore between said closing means and said last-mentioned end of said one member and releasably engaging said shroud, means exteriorly of said housing and supported thereby and engaging said other member and forcing said members toward said one end of said sleeve, thereby compressing said members and causing them to grip said cable and said wall of said bore forming an hermetic seal therewith, and means extending from said shroud interiorly of said housing and electrically connected to said gripping means for electrically connecting said gripping means to said transformer.

6. A transformer for buried installation in an underground electrical distribution system, comprising an hermetically sealed, corrosion resistant, transformer housing having a selected quantity of oil therein, and at least one cable entrance connector, on said housing, said connector comprising a tubularly shaped hermetic insulating bushing hermetically sealed at one end to said housing and extending inside said housing, rigid metallic cap means hermetically sealed to the other end of said bushing within said housing, said cap means being electrically conductive, a readily-releasable frictional engaging means mounted entirely within said cap means and connected thereto for engaging the conductive portion of the end of a cable extending through said insulating bushing, tubularly shaped resilient insulating means within said bushing in engagement with its inner surface and having an inner surface engageable with a cable extending therethrough, and means on said housing engageable with said resilient insulating means for longitudinally compressing same to exclude air at the interfaces between said resilient insulating means, said cable and said bushing.

References Cited

UNITED STATES PATENTS

| | | | |
|---|---|---|---|
| 2,273,538 | 2/1942 | Rogers | 174—75 |
| 2,280,711 | 4/1942 | Machlett et al. | 174—75 |
| 3,239,599 | 3/1966 | Linderholm | 174—18 |
| 2,337,800 | 12/1943 | Cassen | 174—75 |
| 3,290,428 | 12/1966 | Yonkers | 174—73 |

FOREIGN PATENTS 1,270,990    7/1961    France.

OTHER REFERENCES

Electrical World, vol. 160, No. 21, Nov. 18, 1963, p. 107.

LARAMIE E. ASKIN, *Primary Examiner.*